(12) United States Patent
Won (10) Patent No.: US 6,373,480 B1
(45) Date of Patent: Apr. 16, 2002

(54) METHOD FOR EDITING INFORMATION ONTO IMAGES AND PLAYING BACK THE EDITED IMAGES IN AN INTERACTIVE SYSTEM (75) Inventor: Seok-Jin Won, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/112,241

(22) Filed: Jul. 9, 1998

(30) Foreign Application Priority Data

Nov. 29, 1997 (KR) ............................................. 97-64440

(51) Int. Cl.[7] ................................................ H04N 7/15
(52) U.S. Cl. ...................... 345/328; 725/114; 348/14.09
(58) Field of Search ........................ ; 348/14.07, 14.08, 348/14.09, 14.1, 14.14; 345/328; 725/105, 114, 115, 135; H04N 7/167, 7/15, 7/14

(56) References Cited

U.S. PATENT DOCUMENTS

| 5,307,172 | A | | 4/1994 | Oh |
| 5,493,345 | A | | 2/1996 | Ishikawa et al. |
| 5,649,171 | A | | 7/1997 | Craven et al. |
| 5,808,662 | A | * | 9/1998 | Kinney et al. |
| 6,055,314 | A | * | 4/2000 | Spies et al. |

FOREIGN PATENT DOCUMENTS

| EP | 0332322 | 9/1989 |
| EP | 0526064 | 2/1993 |
| EP | 0588243 | 3/1994 |
| WO | 9308664 | 4/1993 |
| WO | 9514280 | 5/1995 |

OTHER PUBLICATIONS

IBM Techincal Disclosure #NN95099279, Sep. 1995.*

* cited by examiner

Primary Examiner—David E. Harvey
(74) Attorney, Agent, or Firm—Pennie & Edmonds LLP (57) ABSTRACT A method for editing images by inserting information therein in an interactive system provided with a mutual communication structure between a client equipment and a server equipment, is provided. The information includes index data, subscriber data, video data and WB data. The edited images including the information inserted are stored in storage media, such as hard disks or optical disks, included in the server equipment employed in the interactive system. And, a method for playing back edited images information in response to a playback instruction for the edited images information requested by an interactive system subscriber by using the interactive system provided with a mutual communication structure between a client equipment and a server equipment is also provided.

5 Claims, 7 Drawing Sheets

METHOD FOR EDITING INFORMATION ONTO IMAGES AND PLAYING BACK THE EDITED IMAGES IN AN INTERACTIVE SYSTEM

FIELD OF THE INVENTION

The present invention relates to an interactive system; and, more particularly, to a method for editing images by inserting information therein and for playing back the edited images including the information in the interactive system.

DESCRIPTION OF THE PRIOR ART

A conventional interactive system such as a video on demand(VOD) system comprises a server equipment, a client equipment, and a communication network. The server equipment typically includes a communication module, a subscriber management module and a video management module. The communication module communicates with the client equipment and the subscriber management module manages and stores subscriber information. The video management module manages and stores video information and images to be provided to the client equipment. The subscriber management module and the video management module are equipped with storage media, such as hard disks or optical disks, respectively. The server equipment stores the images along with the subscriber and the video information in the storage media in the form of digital signals and provides the client equipment with the stored images and video information through the communication module upon the request from an interactive system subscriber, wherein the stored images are motion or still pictures.

The client equipment typically includes an input device, an output device, a video interface module, a communication module, and a decoding module. The input device, such as a keyboard, a mouse, a tablet or a touch screen, serves to accept an instruction from a user or a subscriber. The decoding module decodes the encoded video information and images transmitted thereto from the server equipment via the communication module. The video interface module processes the decoded video information and the images to provide processed data to the output device. The output device, e.g., a flat panel display, displays the processed data. Up to now, however, the conventional interactive systems are provided with only basic functions such as a normal playback and fast playback mode, a rewind mode, a pause mode, and a jumping mode to skip from one point to another point.

SUMMARY OF THE INVENTION

It is, therefore, an object of the present invention to provide a method, for use in an interactive system, capable of editing images by inserting information therein and playing back the edited images.

In accordance with the present invention, there is provided a method for editing images by inserting information therein in an interactive system provided with a mutual communication structure between a client equipment and a server equipment, wherein the edited images including the information inserted are stored in storage media employed in the server equipment, comprising the steps of:

a) establishing a whiteboard (WB) mode in the client equipment in response to a WB selection instruction requested by the interactive system subscriber;

b) displaying a WB picture over the images to receive WB data generated by the subscriber, wherein the WB picture informs the subscriber that the WB mode is initiated and the images are being displayed on a screen via an output device employed in the client equipment;

(c) creating edited images information by using the WB data generated by the subscriber, data generated by the client equipment and the corresponding images;

(d) transmitting the edited images information created from the client equipment to the server equipment, in response to a storage instruction requested by the subscriber;

(e) determining whether the subscriber requesting the storage instruction is an authorized subscriber by using a subscriber list in the server equipment; and (f) storing the edited images information transmitted from the client equipment in the storage media employed in the server equipment based on the result of the step (e).

Furthermore, in accordance with the present invention, there is provided a method for playing back edited images information in response to a playback instruction for the edited images information requested by an interactive system subscriber by using the interactive system provided with a mutual communication structure between a client equipment and a server equipment, comprising the steps of:

(i) determining whether the subscriber requesting the playback instruction is an authorized subscriber;

(ii) transmitting the playback instruction to the server equipment and converting the playback instruction into a retrieval instruction based on the result of the step (i);

(iii) retrieving the requested edited images information in response to the retrieval instruction from storage media employed in the server equipment;

(iv) transmitting the retrieved edited images information from the server equipment to the client equipment;

(v) checking whether the retrieved edited images information transmitted from the server equipment is identical to the requested edited images information; and (vi) displaying the retrieved edited images information on a screen via an output device included in the client equipment based on the result of the step (v).

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
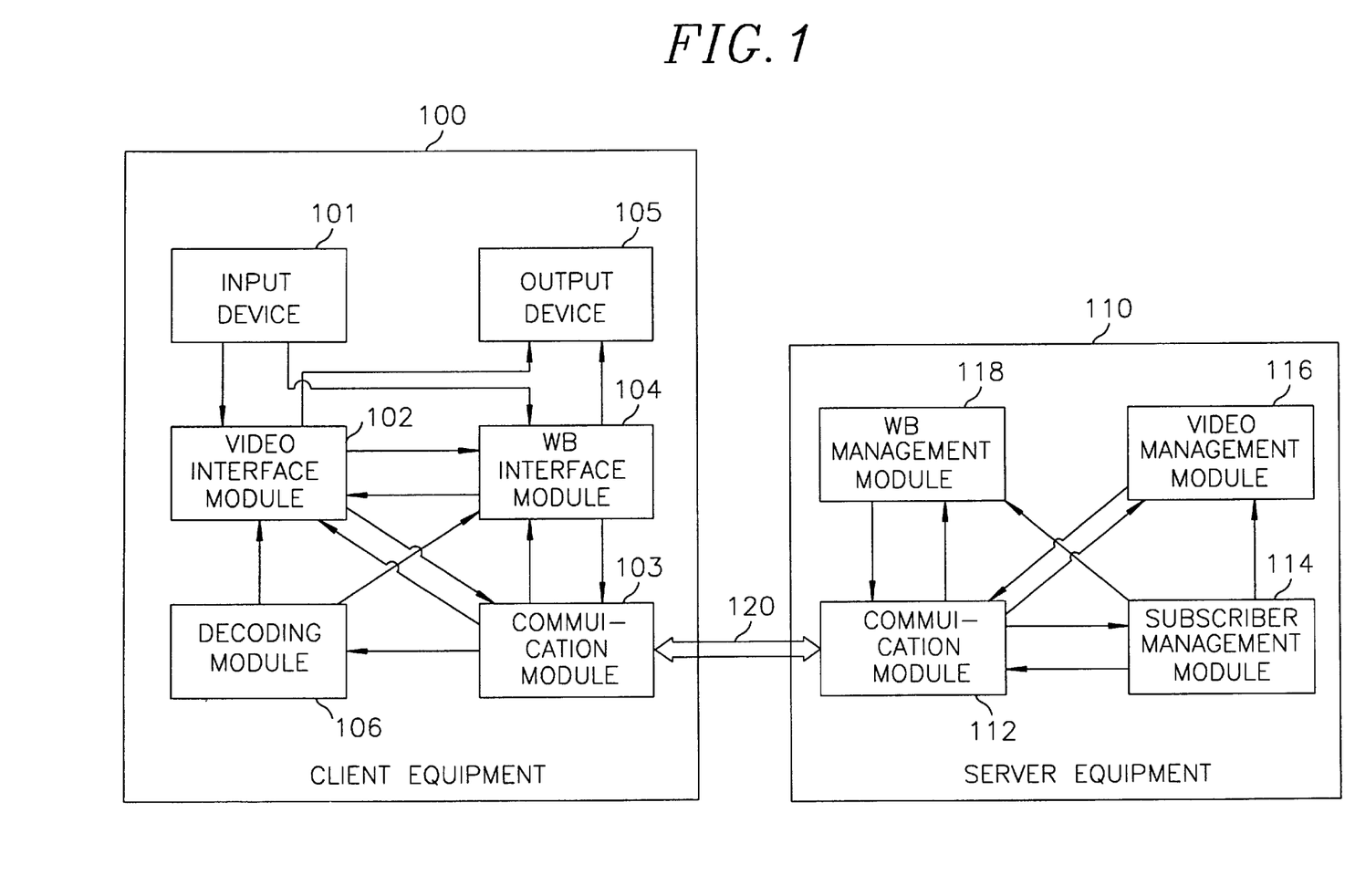
FIG. 1 shows a schematic block diagram of an interactive system capable of editing an image and playing back the edited image information in accordance with the present invention.

With reference to FIG. 1, there is shown a schematic block diagram of an interactive system capable of editing an image by inserting whiteboard (WB) information and playing back the edited image in accordance with the present invention. The interactive system comprises a client equipment 100, a server equipment 110, and a communication network 120. Through the communication network 120, the client equipment 100 is interconnected with the server equipment 110. As shown in FIG. 1, the client equipment 100 includes an input device 101, a video interface module 102, a communication module 103, an output device 105, a decoding module 106 same as the ones in the prior art, and a whiteboard (WB) interface module 104. And, the server equipment 110 includes a communication module 112, a subscriber management module 114, a video management module 116 same as in the prior art, and a WB management module 118.

Figure 2:
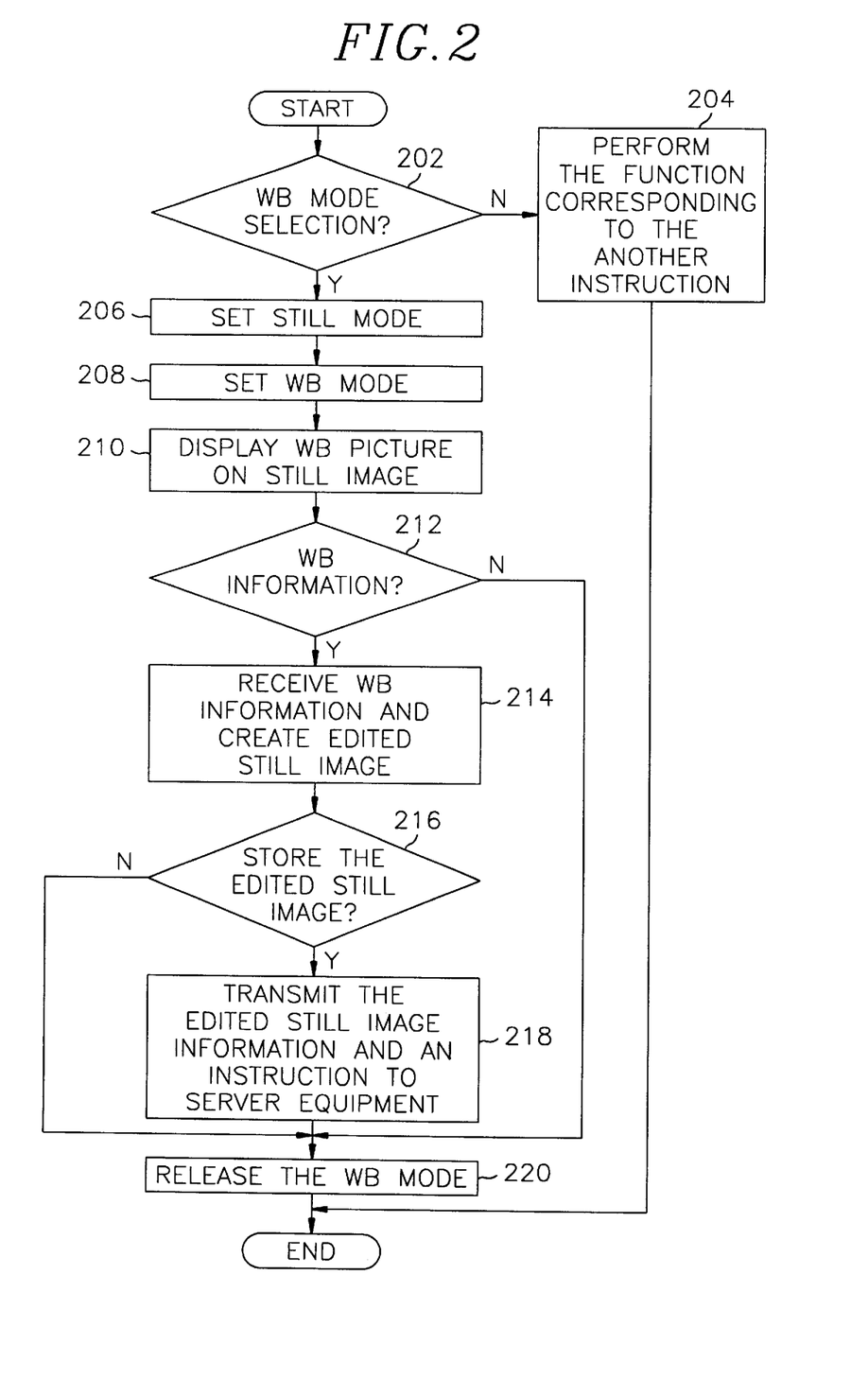
FIG. 2 illustrates a flow chart of the client equipment operation for editing the still image by inserting the WB information therein through a WB picture in accordance with the present invention.
Figure 3A:
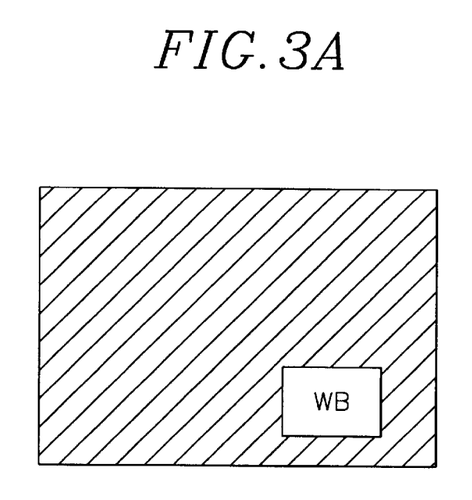
FIGS. 3A and 3B present the WB picture displayed on a screen and the scheme of the edited still image information, respectively.
Figure 3B:
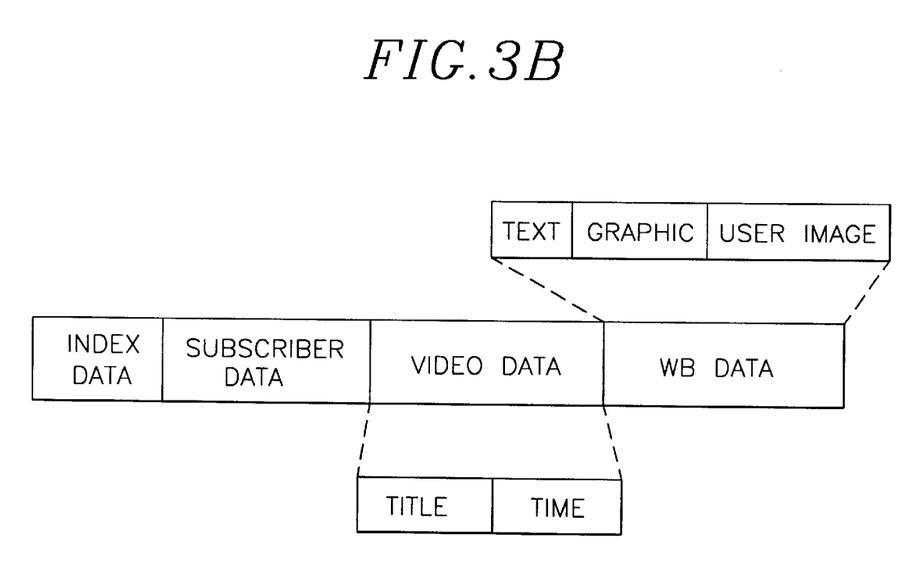

Now, the operation of the client equipment 100 will be described in detail with reference to FIGS. 2 to 4. If a subscriber or a user inputs an instruction via the input device 101 while he watches an image via the output device 105, the video interface module 102 determines whether the inputted instruction corresponds to a whiteboard (WB) selection signal at step 202, the WB selection signal representing a start of a WB mode. If the determination result is negative, the process proceeds to step 204. At step 204, the video interface module 102 performs a conventional function such as a playback, a fast forward, a rewind or a slow, a stop, or a still mode, in response to the inputted instruction and the process terminates.

On the other hand, if the determination result is positive at step 202, the process goes to step 206. At step 206, the video interface module 102 sets the output image as the still mode to provide a still image and transfers the control over the client equipment 100 to the WB interface module 104. Thereafter, at step 208, the WB interface module 104 sets the client equipment 100 to the WB mode to perform the function of the WB mode. Subsequently, the WB interface module 104 proceeds to step 210 to display a WB picture overlapped with the still image as shown in FIG. 3A, the WB picture informing the subscriber that the WB mode is initiated. And then, at step 212, the WB interface module 104 waits for WB information generated by the subscriber via the input device 101 for a predetermined period. If the WB information is not inputted during the predetermined period, the process proceeds to step 220. If the WB information is inputted, the WB interface module 104 receives, at step 214, the WB information and edits the still image by inserting therein the WB information to thereby create an edited still image. The WB information can be a text having numerals, characters, symbols, etc, graphics, user images or the combination thereof or can be a data set which gives rise to a special effect, e.g., blurring effect, in the still image. The WB information may be inserted in any location in the still image or generated in the area confined by the WB picture.

After creating the edited still image at step 214, the WB interface module 104 proceeds to step 216 to determine whether or not a storage request signal is generated by the subscriber within a preset period. If the storage request signal is not received during the preset period, the process goes to step 220. If the storage request signal is received during the preset period at step 216, the WB interface module 104 proceeds to step 218 and then transmits the storage request signal and the edited still image information to the server equipment 110 via the communication module 103 and the communication network 120. The edited still image information includes therein, as shown in FIG. 3B, index data, subscriber data, video data, and WB data. The index data contains identification information for use in retrieving the still image corresponding to the edited still image information according to the subscriber request. The subscriber data contains identification information on the subscriber who has generated the edited still image. The video data contains title and time data representing the still image edited and the WB data contains text, graphic and user image data representing the WB information generated by the subscriber. The title data represents the title of the program to which the still image belongs. The time data depicts an index of the still image within the program. Thereafter, the WB interface module 104 proceeds to step 220, wherein it releases the WB mode and the process terminates.

Figure 4:
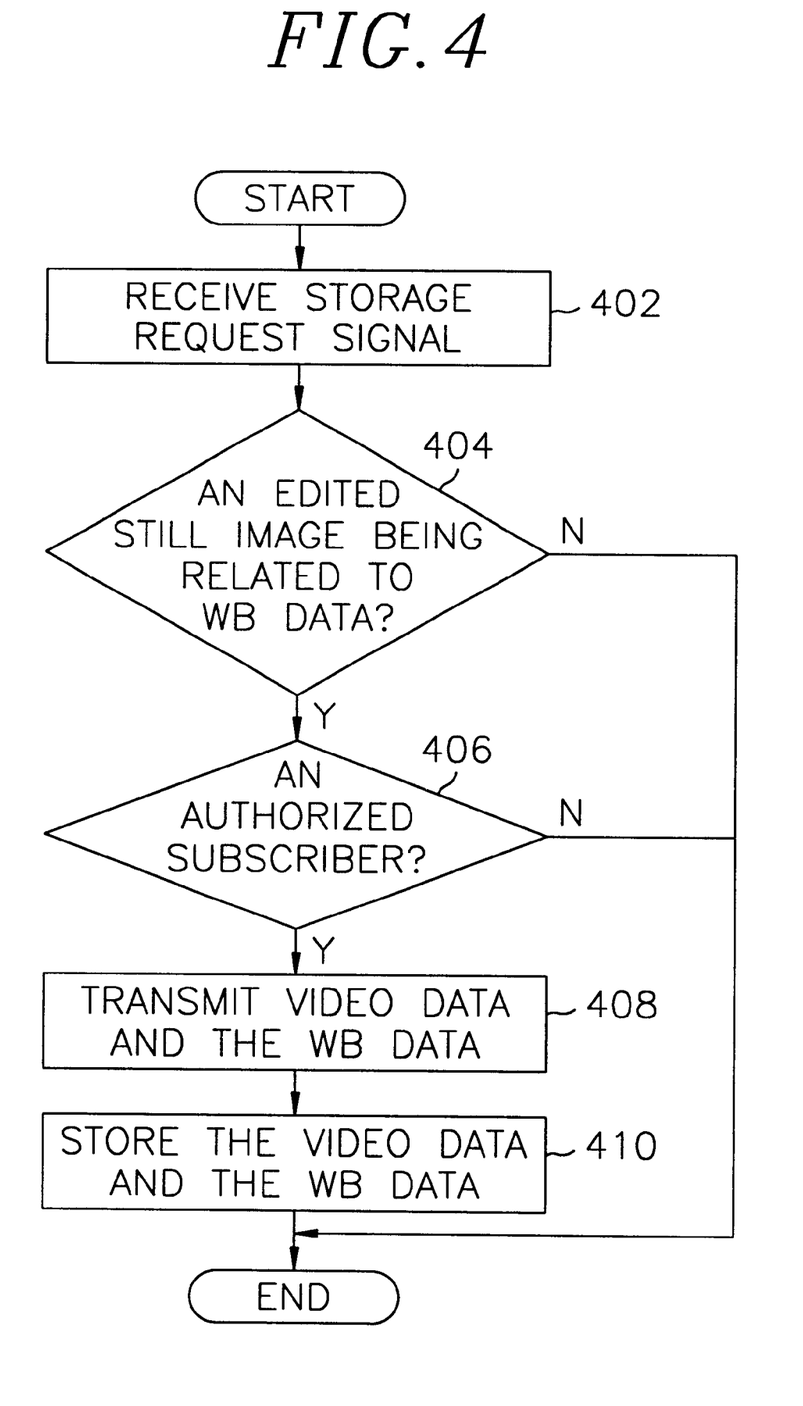
FIG. 4 depicts a flow chart of the server equipment operation for storing the edited still image information therein by an instruction of the interactive system subscriber.

Referring to FIG. 4, there is shown a flow chart illustrating the storing operation of the edited still image information in the server equipment 110. Once the storage request signal and the edited still image information are received by the subscriber management module 114 via the communication network 120 and the communication module 112 at step 402, the process goes to step 404 wherein the subscriber management module 114 checks whether the edited still image information includes the WB data. If the WB data is not included, the storage operation terminates; and, if otherwise, the process goes to step 406.

At step 406, the subscriber management module 114 reads the subscriber data included in the edited still image information transmitted from the client equipment 100 to determine whether the subscriber is an authorized user of the WB mode, wherein the subscriber management module 114 has a list of subscribers entitled to use or access the WB mode. If the subscriber is determined as an unauthorized subscriber, the storage request signal is disregarded and the process terminates. In case that the determination result is positive at step 406, the subscriber management module 114 proceeds to step 408, wherein it transmits video data and the index data included in the edited still image information to the video management module 116 and also the WB data generated by the subscriber and the index data to the WB management module 118.

At step 410, the video management module 116 stores the video data with the index data in a storage medium included therein and the WB management module 118 stores the WB data with the index data in a storage medium therein, and thereafter the storage process is terminated.

Figure 5A:
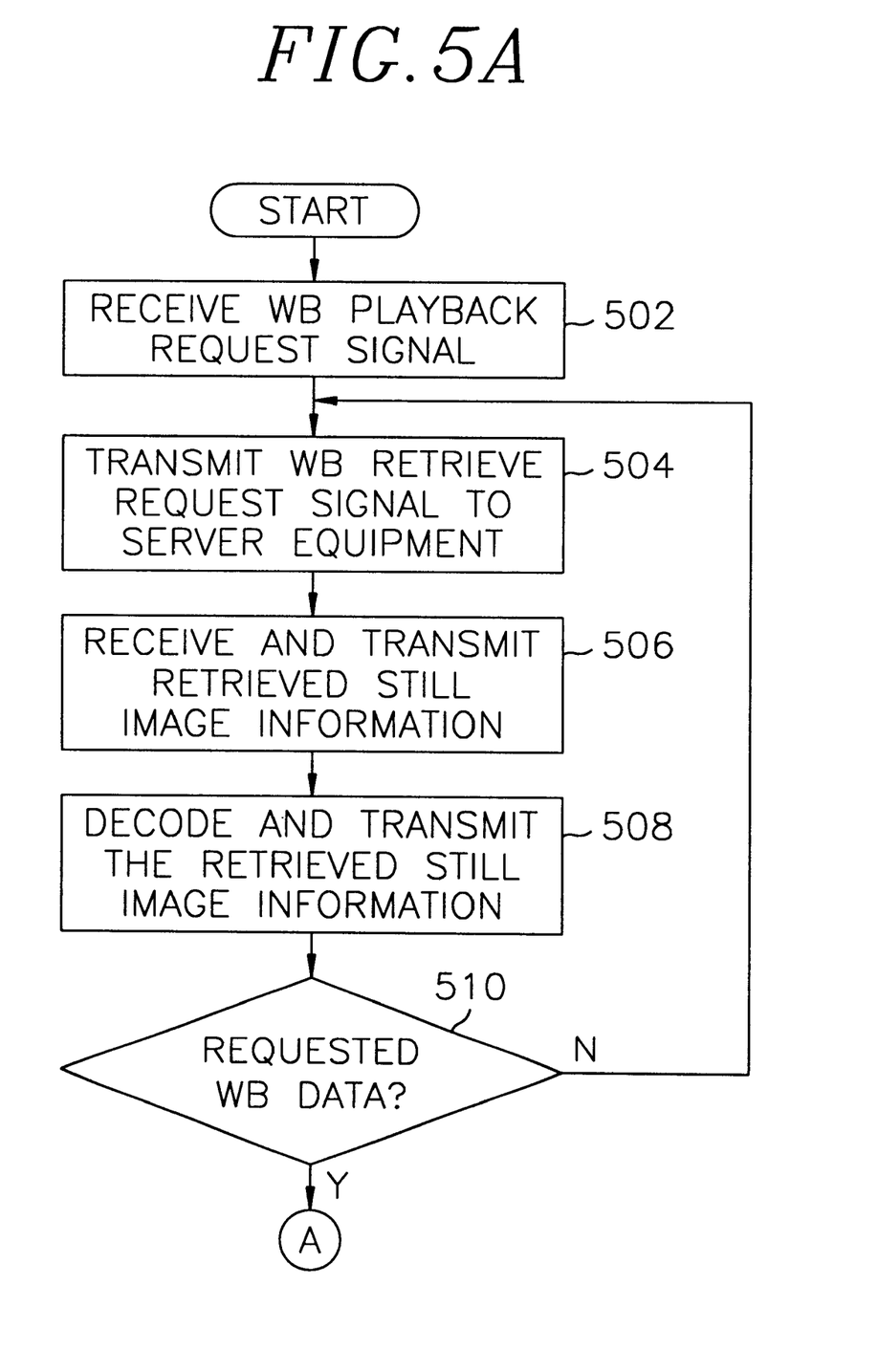
FIGS. 5A and 5B denote a flow chart of the client equipment operation for playing back the edited still image information stored in the server equipment.
Figure 5B:
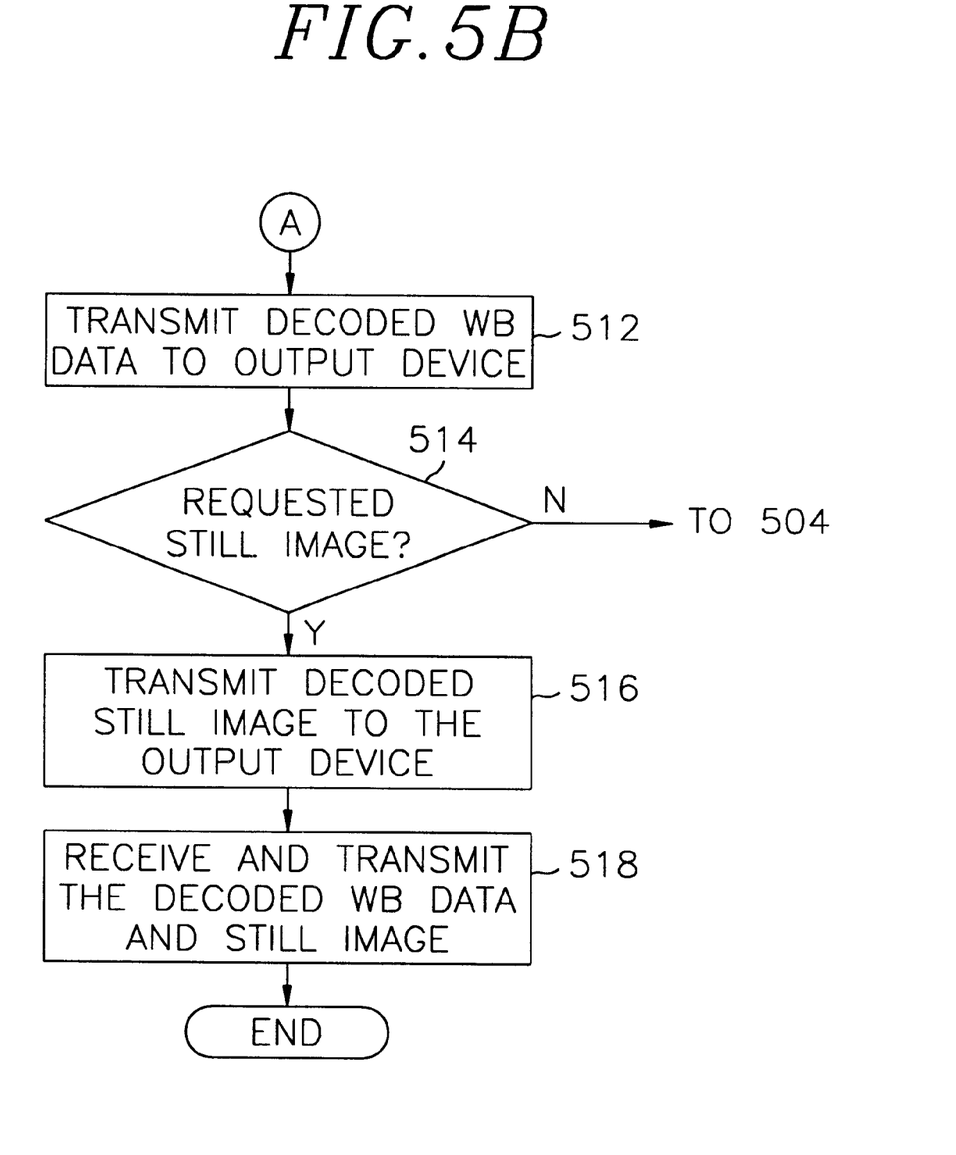

Now, the operation of playing back the edited still image information will be described in detail with reference to FIGS. 5A to 6. FIGS. 5A and 5B show a flow chart for illustrating the playing-back operation carried out at the client equipment 100, whereas FIG. 6 depicts a flow chart of the playing-back operation performed at the server equipment 110.

When a subscriber inputs a WB playback request signal, the WB interface module 104 receives the WB playback request signal through the input device 101 at step 502, the WB playback request signal including therein an index representing an edited still image that the subscriber wants to playback. Thereafter, at step 504, the WB interface module 104 converts the WB playback request signal into a WB retrieve request signal; transmits the WB retrieve request signal to the server equipment 110 via the communication module 103; and waits until the WB retrieve request signal is responded by the server equipment 110. The WB retrieve request signal includes therein subscriber data representing the client equipment 100 sending the WB retrieve request signal and the index data of the edited still image requested.

Figure 6:
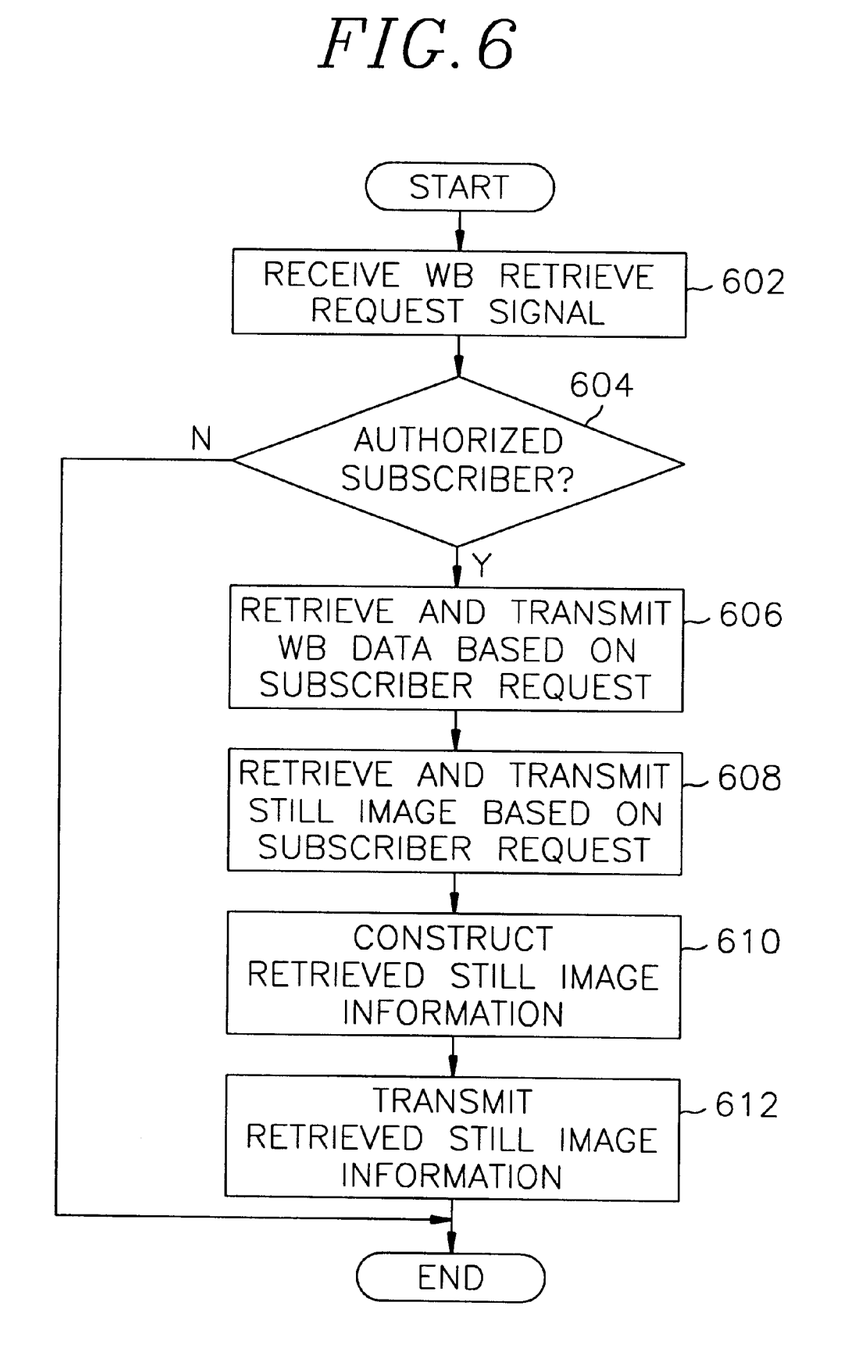
FIG. 6 represents a flow chart of the server equipment operation for playing back the edited still image information by an instruction of the interactive system subscriber.

Referring to FIG. 6, at step 602, the subscriber management module 114 receives the WB retrieve request signal transmitted from the client equipment 100 through the communication network 120 and the communication module 112. And then, the subscriber management module 114 authenticates at step 604 the usage authority of the subscriber requesting the edited still image. That is, the subscriber management module 114 contains therein a list of client equipments entitled to access the edited still image in the server equipment 110 and checks whether the client equipment represented by the subscriber data is included in the list. If the authentication result is positive at step 604, the subscriber management module 114 proceeds to step 606; and, if otherwise, it terminates the process. At step 606, the subscriber management module 114 controls the WB management module 118 to retrieve WB data corresponding to the index of the edited still image requested and transmits same to the communication module 112.

Subsequently, at step 608, the subscriber management module 114 controls the video management module 116 to retrieve a coded still image corresponding to stored video data having an index identical to the one of the edited still image requested and transmits same to the communication module 112. Thereafter, at step 610, the subscriber management module 114 controls the communication module 112 to generate retrieved still image information, the retrieved still image information including the retrieved WB data, the retrieved coded still image and the index corresponding to the retrieved WB data and the retrieved still image. After generating the retrieved still image information, the communication module 112 transmits at step 612 the retrieved still image information to the client equipment 100 via the communication network 120.

Returning to FIG. 5A, if the retrieved still image information is inputted from the server equipment 110 to the client equipment 100, the WB interface module 104 proceeds to step 506; and, controls the communication module 103 to receive the retrieved still image information and transmit same to the decoding module 106. Subsequently, at step 508, the decoding module 106 decodes the retrieved still image information to transmit the decoded still image, the video data and the index data to the video interface module 102 and the decoded WB data and the index data to the WB interface module 104, respectively. At step 510, the WB interface module 104 determines whether the decoded WB data inputted corresponds to the requested WB data by using the index data transmitted. If the determination result at step 510 is positive, the WB interface module 104 proceeds to step 512 shown in FIG. 5B; and, if otherwise, it returns to step 504. At step 512, the WB interface module 104 transmits the decoded WB data to the output device 105.

On the other hand, at step 514, the video interface module 102 determines whether the decoded still image corresponds to the requested still image by using the index data transmitted. If the determination result at step 514 is positive, the video interface module proceeds to step 516; and, if otherwise, it returns to step 504. At step 516, the video interface module 102 transmits the decoded still image to the output device 105. Subsequently, at step 518, the output device 105 receives the decoded WB data from the WB interface module 104 and the decoded still image from the video interface module 102 to display the same on the screen, and then the process is terminated.

While the present invention has been described with respect to certain preferred embodiments only, other modifications and variations may be made without departing from the spirit and scope of the present invention as set forth in the following claims.

What is claimed is:

1. A method for editing images by inserting information therein in an interactive system provided with a mutual communication structure between a client equipment and a server equipment, wherein the edited images including the information inserted are stored in storage media employed in the server equipment, comprising the steps of:

(a) establishing a whiteboard (WB) mode in the client equipment in response to a WB selection instruction requested by the interactive system subscriber;

(b) displaying a WB picture over the images to receive WB data generated by the subscriber, wherein the WB picture informs the subscriber that the WB mode is initiated and the images are being displayed on a screen via an output device employed in the client equipment;

(c) creating edited images information by using the WB data generated by the subscriber, data generated by the client equipment and the corresponding images;

(d) transmitting the edited images information created from the client equipment to the server equipment, in response to a storage instruction requested by the subscriber;

(e) determining whether the subscriber requesting the storage instruction is an authorized subscriber by using a subscriber list in the server equipment; and (f) storing the edited images information transmitted from the client equipment in the storage media employed in the server equipment based on the result of the step (e).

2. The method according to claim 1, wherein the edited images information created in the client equipment has the WB data, the corresponding images, the data including index data, subscriber data, video data.

3. The method according to claim 2, wherein processes at the determination step (d) are performed by using the subscriber data included in the edited images information created by the client equipment.

4. A method for playing back edited images information in response to a playback instruction for the edited images information requested by an interactive system subscriber by using the interactive system provided with a mutual communication structure between a client equipment and a server equipment, comprising the steps of:

(i) determining whether the subscriber requesting the playback instruction is an authorized subscriber;

(ii) transmitting the playback instruction to the server equipment and converting the playback instruction into a retrieval instruction based on the result of the step (i);

(iii) retrieving the requested edited images information in response to the retrieval instruction from storage media employed in the server equipment;

(iv) transmitting the retrieved edited images information from the server equipment to the client equipment;

(v) checking whether the retrieved edited images information transmitted from the server equipment is identical to the requested edited images information; and (vi) displaying the retrieved edited images information on a screen via an output device included in the client equipment based on the result of the step (v), wherein the edited images information created in the client equipment has the WB data, the corresponding images, the data including index data, subscriber data and video data.

5. The method according to the claim 4, wherein processes at the determination step (i) are performed by using the subscriber data included in the retrieved edited images information.

* * * * *